S. G. BUSKARD.
TROLLEY WHEEL.
APPLICATION FILED APR. 10, 1914.
1,156,270.
Patented Oct. 12, 1915.
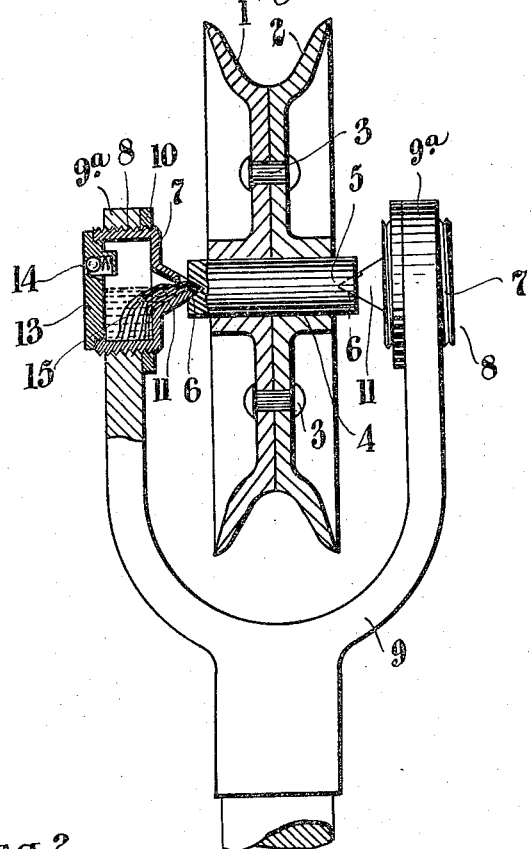
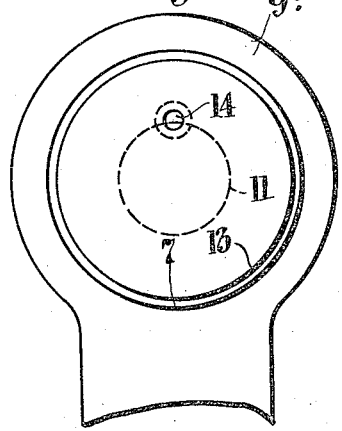
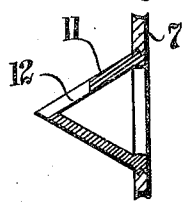
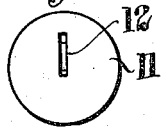
Witnesses.
Inventor.
S. G. BUSKARD.

UNITED STATES PATENT OFFICE.

SAMUEL GORDON BUSKARD, OF HAMILTON, ONTARIO, CANADA, ASSIGNOR OF ONE-SIXTH TO LEVI LYONS, ONE-SIXTH TO FREDERICK G. MUMMERY, AND ONE-SIXTH TO HENRY CARPENTER, ALL OF HAMILTON, CANADA.

TROLLEY-WHEEL.

1,156,270.      Specification of Letters Patent.      Patented Oct. 12, 1915.

Application filed April 10, 1914. Serial No. 830,934.

*To all whom it may concern:*

Be it known that I, SAMUEL GORDON BUSKARD, of the city of Hamilton, in the county of Wentworth, in the Province of Ontario, Canada, have invented certain new and useful Improvements in Trolley-Wheels, of which the following is the specification.

My invention relates to improvements in trolley wheels, and the object of the invention is to devise a simple and effective trolley wheel in which the friction on the wheel when turning will be reduced to a minimum; a further object is to construct a self-oiled wheel which will not throw the oil about; a still further object is to construct a wheel which will be more efficient than those at present in use and which can be readily removed and placed on the trolley pole with a minimum of trouble.

The invention consists of a trolley wheel constructed in two parts and having a central aperture extending therethrough, an axle pressed into the said aperture, said axle having conical indentures in the ends thereof, oil reservoirs threaded into the upper ends of the harp, said oil reservoirs having inwardly extending conical shaped projections adapted to be inserted into the conical indentures in the wheel and having slots therein through which the oil is introduced into the conical shaped indentures, all as hereinafter more particularly described and illustrated in the accompanying drawings in which:—

Figure 1 represents a vertical cross section of a wheel constructed according to my invention showing the same applied to the harp of a trolley pole. Fig. 2 is a side view of one of the upper ends of the harp showing an oil reservoir constructed according to my invention applied thereto. Fig. 3 is a front view of one of the conical projections on the oil reservoir showing the slot therein, and Fig. 4 is a vertical section of a modified form of conical projection showing the same removable from the oil reservoir.

Like characters of reference indicate corresponding parts in the different views.

1 and 2 are the portions of the trolley wheel suitably secured together by the rivets 3 and having the central aperture 4 extending therethrough.

5 is an axle pressed into the aperture 4 in the wheel and adapted to rotate with the wheel.

6, 6 are the conical shaped indentures in the ends of the shaft.

7, 7 are the oil reservoirs, said oil reservoirs being externally threaded and designed to be inserted into apertures 8 in the upper ends 9ª of the harp 9.

10, 10 are lock nuts threaded onto the oil reservoirs and adapted to hold the same in position on the trolley harp.

11, 11 are the inwardly extending conical shaped projections on the oil reservoirs 7, said conical shaped projections having slots 12 therein.

13, 13 are caps for the reservoirs, and 14, 14 are vents for the introduction of oil into the reservoirs.

15, 15 are wicks in the reservoirs extending into the slots 12.

From the above description it will be seen that the conical projections on the oil reservoirs rotatably support the trolley wheel, as these projections are adapted to be inserted in the conical shaped indentures in the axle thereof. Further when oil is introduced into the oil reservoirs it is fed by the wicks 15 to the conical shaped indentures, thus lubricating the same and preventing any friction between these indentures and the conical shaped projections.

The wheel can be readily removed by loosening the lock nuts 10 and unscrewing the oil reservoirs. Further these can be tightened up when desired upon the projections wearing.

In the modification shown in Fig. 4 the conical shaped projections are detachably secured to the reservoirs in order that should they wear they can be replaced without necessitating the replacing of the whole reservoir.

From the above description it will be seen that a trolley wheel constructed according to my invention will rotate with the minimum of friction and will be exceedingly cheap and the parts can be replaced at a very small cost.

What I claim as my invention and desire to secure by Letters Patent is:—

In a device of the character described, the combination with the trolley wheel and harp of the trolley pole, of an axle extending through the trolley wheel and rigidly secured thereto, said axle having conical shaped indentures in the ends thereof, oil reservoirs threaded into the upper ends of the harp, lock nuts for holding said oil reservoirs in position, removable inwardly extending hollow conical projections suitably threaded into the inner ends of the oil reservoirs, said projections inserted into the indentures in the ends of the axle and having slots extending through each of the projections with the interior of the projections, said slots extending from the apex to a point intermediately of their width, and wicks extending into the slots and down into the oil reservoirs.

In testimony whereof, I have signed at the city of Hamilton, in the county of Wentworth, in the Province of Ontario, Canada, this 30th day of March 1914.

SAMUEL GORDON BUSKARD.

Witnesses:
F. B. FETHERSTONHAUGH,
L. J. GAVIN.